Figure 1:
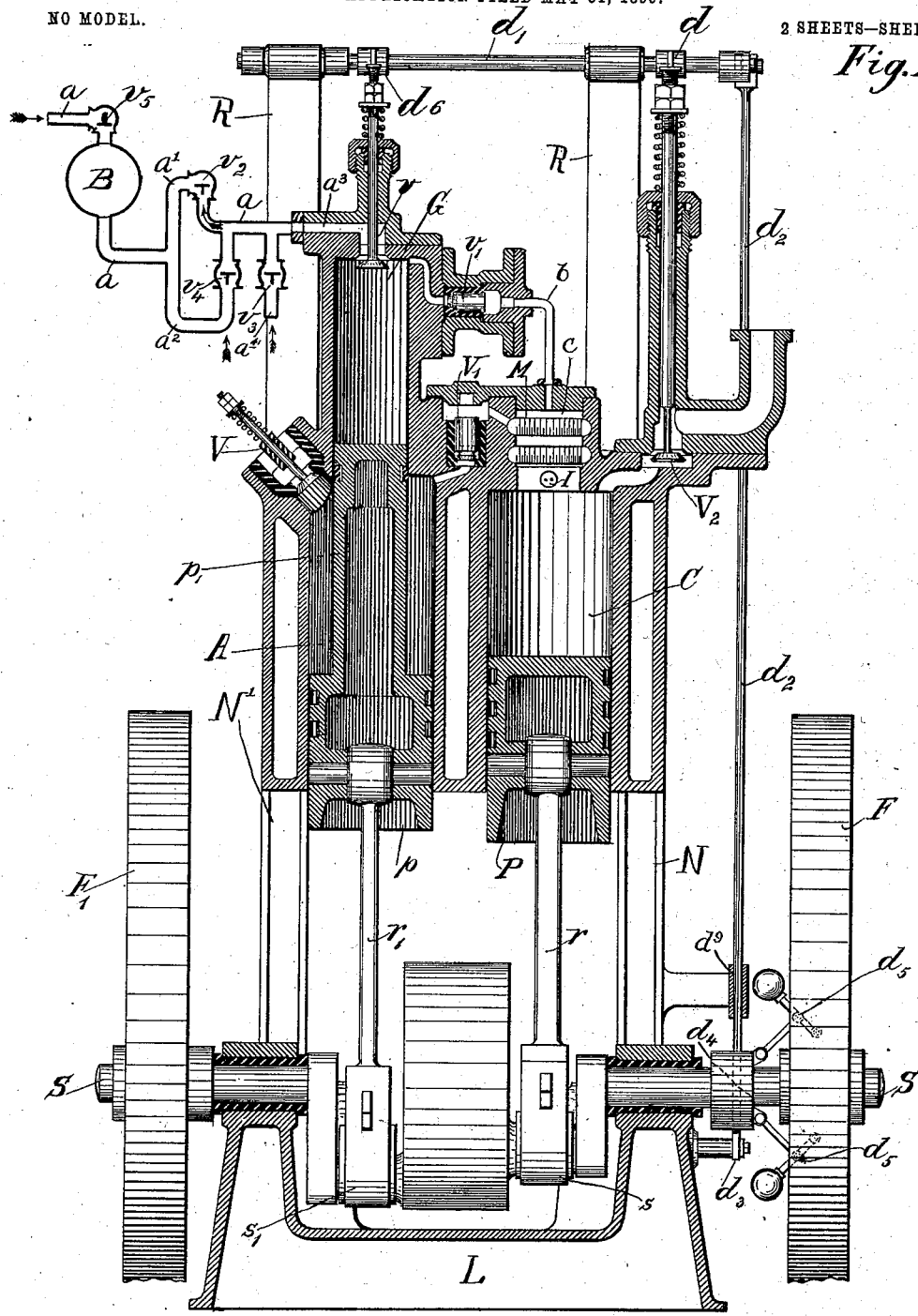

No. 729,983. PATENTED JUNE 2, 1903.
H. F. WALLMANN.
INTERNAL COMBUSTION ENGINE.
APPLICATION FILED MAY 31, 1899.
NO MODEL. 2 SHEETS—SHEET 1.

Witnesses
B. Jacobs.
Franklin L. Chase Jr.

Inventor
Henning Friedrich Wallmann.

No. 729,983. Patented June 2, 1903.

UNITED STATES PATENT OFFICE.

HENNING FRIEDRICH WALLMANN, OF CHICAGO, ILLINOIS, ASSIGNOR TO THE WALLMANN ENGINE COMPANY, A CORPORATION OF ILLINOIS.

INTERNAL-COMBUSTION ENGINE.

SPECIFICATION forming part of Letters Patent No. 729,983, dated June 2, 1903.

Application filed May 31, 1899. Serial No. 718,904. (No model.)

*To all whom it may concern:*

Be it known that I, HENNING FRIEDRICH WALLMANN, a citizen of the United States, residing at Chicago, in the county of Cook and State of Illinois, have invented certain new and useful Improvements in Internal-Combustion Engines, of which the following is a specification.

My invention relates to internal-combustion engines of the two-cycle type, in which a charge of compressed air is mixed in suitable proportions with an inflammable gas or oil-vapor, ignited and expanded within the combustion-cylinder, and made to perform work against the piston at every outstroke of the latter. Engines of this type have heretofore been frequently found somewhat difficult of successful and economical operation, owing chiefly to the difficulty experienced in effecting the thorough expulsion of the burned products of combustion without at the same time wasting a portion of the incoming charge or to the liability of a considerable residuum of the burned products of combustion remaining in the cylinder and becoming mixed with, and thereby impairing the efficiency of, the incoming charge. The excessive heat generated in the cylinder-walls of a two-cycle engine and the liability to premature explosion of the incoming charge have also contributed to the difficulties experienced in the practical operation of this type of engine.

Among the several objects therefore sought to be attained by the improvements constituting my present invention I may mention, first, increased efficiency and avoidance of premature explosions by thoroughly scavenging the combustion-cylinder by a blast of air at the end of each working stroke of the piston and before the fresh charge is admitted; second, prevention of the waste of fuel by mechanism which provides for the idle return of the fuel in the fuel-pump to the fuel-reservoir while the scavenging operation is taking place in the combustion-cylinder and which permits the fuel to be pumped to the combustion-cylinder only after the scavenging operation has taken place and the exhaust-valve been closed; third, the utilization of the maximum potential of each charge by the firing of the latter at such a point in the working stroke of the piston as I have found to be most advantageous to secure the maximum expansive effect of the combustion; fourth, the more even distribution of the heat of combustion along the cylinder-walls by producing the ignition at a moment when the piston is already moving rapidly on its outstroke, and, fifth, increased economy in the operation of the engine as a result of the features of improvement above alluded to.

My invention consists, therefore, in the means and mechanism for producing the results above specified, substantially as hereinafter described and claimed and as shown in the accompanying drawings, in which—

Figure 2:
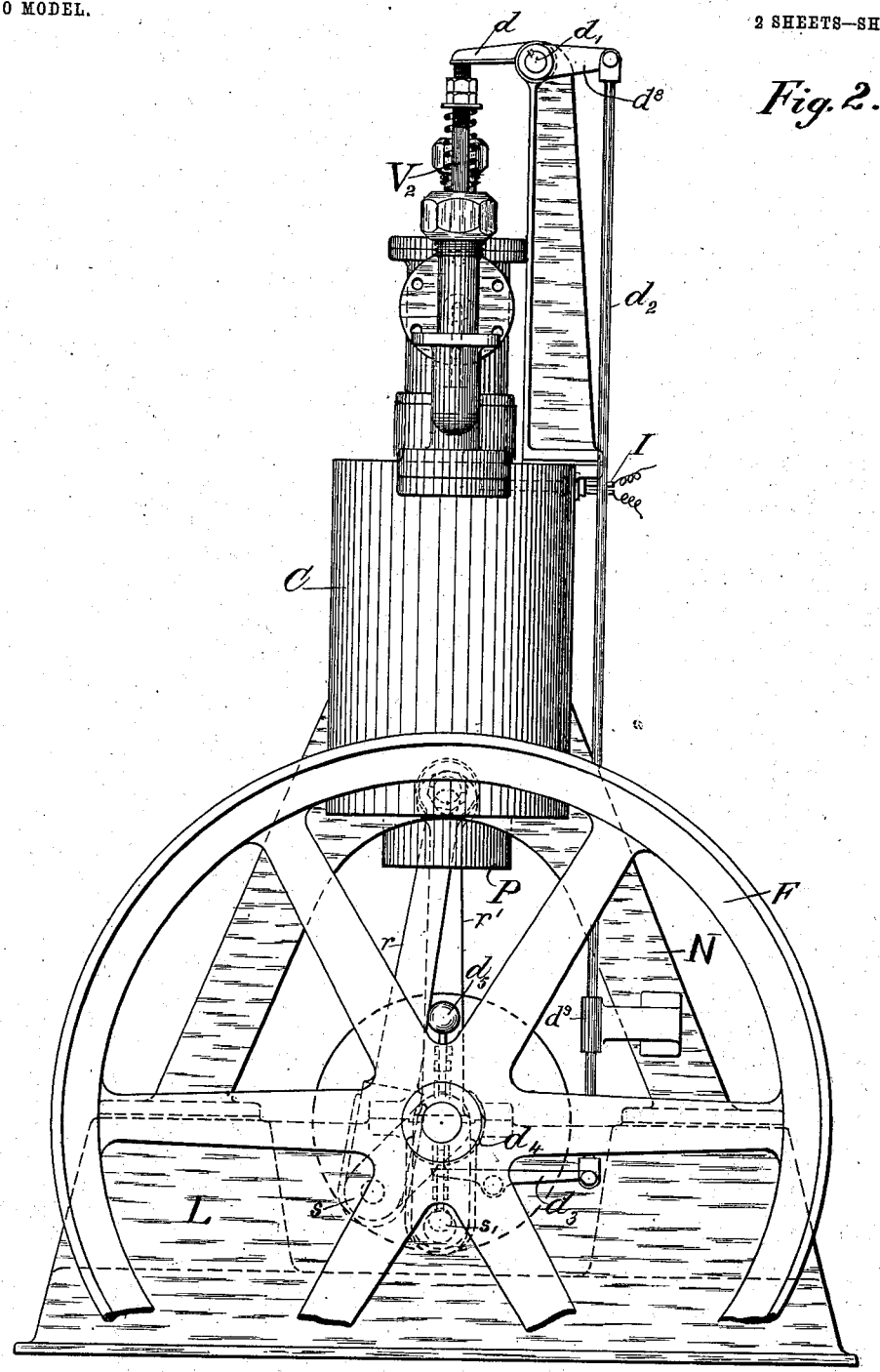

Figure 1 is a vertical section of my improved engine; and Fig. 2 is a side elevation of the same, the fly-wheels in both figures being broken away.

Similar letters refer to similar parts throughout both views.

L designates the base or bed plate of the engine, in which is journaled the crank-shaft S, carrying fly-wheels F and F' at either end thereof. Supported vertically on the bed-plate L are the parallel frames N N', which carry at their upper ends the combustion-cylinder C and the air-pump cylinder A. Arranged tandem with and forming an extension of the air-pump cylinder A is the cylinder G of the fuel-pump, the plungers p of the air-pump and p' of the fuel-pump being formed integral, as shown, or rigidly connected together, so as to move simultaneously under impulses imparted from the crank-shaft S through crank s' and connecting-rod r'. Within combustion-cylinder C is the working piston or plunger P, the latter connected to and operating the crank-shaft S through the agency of connecting-rod r and crank s. It will be noticed that the two cranks s and s' are not set in parallel relation to each other on the crank-shaft S, but about one-eighth of a revolution apart, the crank s, connected to the working piston P, being approximately forty-five degrees in advance of the crank s', which actuates the pump-plungers p and p', as best shown in dotted lines in Fig. 2. The purpose of this relative arrangement of cranks will be disclosed later in the description of the operation of the engine.

Referring to the air-pump A, it will be noticed that the presence of the elongated plunger $p'$, formed directly on the upper face of the air-pump plunger $p$, creates an annular air-compression chamber within the cylinder A, to which air is admitted on the suction-stroke through the inlet-valve V and out of which it is forced on the compression-stroke through valve $V'$ and a mixer M into the combustion-cylinder C. The cylinder of the fuel-pump G is provided, preferably at its upper end, with an inlet-valve $v$, normally held closed by a spring, but adapted to open on the suction-stroke and adapted to be positively held open during a portion of the discharge-stroke by means and for a purpose hereinafter described.

Reference-letter $a$ represents a pipe which may connect with any main or pipe (not shown) containing ordinary illuminating-gas. An inwardly-opening check-valve $v^5$ is located at a convenient point therein, and below this check-valve a rubber bag B is interposed in the pipe $a$. At a point between the bag B and the pump-cylinder G the pipe $a$ may conveniently be divided into two branches $a'$ $a^2$, the former containing an outwardly-opening check-valve $v^2$ and the latter having an inwardly-opening check-valve $v^4$.

At a suitable point in the gas-inlet pipe $a$, preferably adjacent its union with the inlet-port $a^3$ in the head of cylinder G, is introduced a short air-inlet pipe $a^4$, containing an inwardly-opening check-valve $v^3$.

$v'$ is the discharge-valve of the fuel-pump, and $b$ is a pipe leading therefrom to a chamber $c$, formed in the head of the combustion-cylinder and containing the mixer M.

Turning next to the combustion-cylinder C, it will be noted that the discharge-valve $v'$ of the fuel-pump forms, in effect, its fuel-inlet valve, while the discharge-valve $v'$ of the air-pump A forms, in effect, its air-inlet valve.

$v^2$ designates the exhaust-valve of the combustion-cylinder. It is normally held closed by a spring, as shown, but is positively opened at and during the proper period in the engine's operation to effect the exhaust and scavenging of the combustion-cylinder by suitable mechanism, as hereinafter described.

Referring now to the mechanism for actuating and controlling the exhaust-valve $V^2$ of the combustion-cylinder and the inlet-valve $v$ of the fuel-pump, R R designate a pair of standards mounted on top of the cylinders A and C. In the upper ends of these standards is suitably journaled a horizontal rocker-shaft $d'$. Rigidly secured on this rocker-shaft are two short arms or tappets $d$ and $d^6$, the function of the former being to actuate the exhaust-valve $V^2$ of the combustion-cylinder at the proper time, while the office of the latter is to engage and hold open the inlet-valve $v$ of the fuel-pump against the action of its returning-spring at and during that period of time when the air-pump A is engaged in scavenging the combustion-cylinder immediately following a working stroke. The rocker-shaft $d'$ is positively actuated from the crank-shaft S of the engine through the agency of a governor-controlled cam-disk $d^4$ on said crank-shaft, said cam-disk engaging and actuating one arm of a lever $d^3$, pivoted to the bed-plate L, which lever conveys its rocking motion to an arm $d^8$, fast on the end of the rocker-shaft $d'$, through the agency of a connecting-rod $d^2$, which latter may reciprocate vertically through a bearing $d^9$, secured laterally to the frame N.

At $d^5$ is indicated an ordinary ball-governor mounted in the fly-wheel F and connected to the cam-disk $d^4$ in such a way as to vary the position of the latter laterally on the crank-shaft, according to the speed of the engine. It will be noticed that the disengaging edge of the cam (by which is meant that edge of the cam last to engage the lever $d^3$) is formed on a line oblique to the line of the axis of the cam-disk, (see dotted line in Fig. 1,) so that the valves $V^2$ and $v$ will be held open a greater or less time, according to the position of the cam-disk $d^4$ on the shaft S, and the speed of the engine regulated accordingly, as will be more fully explained in the description of the operation.

In the head of the combustion-cylinder and immediately below the mixer M is located the igniter I, which may be of any known and approved type and construction and which is not, therefore, shown and described in detail.

The mixer M may be of any approved construction best adapted to the location shown, but is preferably like the mixer shown, described, and claimed in my pending application, filed December 17, 1898, Serial No. 699,377.

The operation of the engine is as follows: With the parts in the positions shown in the drawings the plungers $p$ and $p'$ of the air and fuel pumps, respectively, have just reached the limit of their downward strokes. The cylinder A is filled with air previously drawn in through inlet-valve V, and the cylinder G is filled with fuel (preferably a non-ignitible mixture of ordinary illuminating-gas and air—as, for instance, equal parts of each) drawn in through check-valves $v^4$ and $v^3$ and inlet-valve $v$, whose returning-spring is light enough to permit the valve to open on the suction-stroke of the pump. The piston P of the combustion-cylinder has completed a working stroke and has already started on its return stroke, its crank having traversed upwardly approximately forty-five degrees from the lower dead-center. (See Fig. 2.) At the completion of the downward or working stroke of piston P the cam $d^4$ opened the exhaust-valve $V^2$ through the mechanism already described and at or about the same time the tappet $d^6$ was brought into engagement with the stem of fuel-inlet valve $v$ to prevent the latter from closing at the completion of the suction-stroke. The burned products of combustion in cylinder C are therefore already exhausting past the open exhaust-valve $V^2$. As now the plunger P continues on its upward movement and plungers $p$ and $p'$ commence theirs air compressed in cylinder A will be forced past valve $V'$ and mixer M into cylinder C and will scavenge the latter cylinder by blowing out the remaining burned products of combustion past the open exhaust-valve $V^2$. At the same time fuel compressed in cylinder G will simply be idly pressed back past the open inlet-valve $v$ and check-valve $v^2$ into the rubber bag B; but no fuel will pass to the combustion-cylinder until after the mechanism controlling valves $v$ and $V^2$ has permitted said valves to close. This closing of valves $v$ and $V^2$ will occur substantially simultaneously after crank-shaft S has made approximately one-fourth of a revolution from its position, as shown in the drawings—that is to say, pump-plungers $p$ and $p'$ will then be about half-way up on their forcing strokes and working piston P will have completed nearly five-sixths of its return stroke. During the remainder of the upward strokes of the three plungers $p$, $p'$, and P the first will be forcing air and the second fuel into cylinder C and the third will be compressing the mixture in said cylinder, and owing to the fact that the working piston is one-eighth of a turn in advance of the pump-plungers the latter will continue to supply the combustible mixture to cylinder C even after working piston P has passed its upper dead-point and has made a considerable start on its downward stroke. At this point when the plungers $p$ and $p'$ have just reached their upper dead-point and the working piston P is already moving rapidly on its downward or outward stroke the charge will be ignited and the pistons driven outwardly to the positions shown, the cylinders G and A drawing in new charges of fuel and air, respectively, whereupon the cycle of operations above described will be repeated.

In connection with the operation of the air and fuel pumps it is noted that the expedient of holding open the inlet-valve of the fuel-pump during all or nearly all the scavenging operation effects the simultaneous and equal compression of the air and fuel forced into the combustion-cylinder. This is important, because where the air and fuel are introduced in the combustion-cylinder at unequal pressures they will not mix properly, but that which is under the greatest compression will rush through or past the other and will enter the cylinder first. Such would be the case in this engine if the fuel in the fuel-pump were put under compression from the very commencement of the compression-stroke, while the scavenging operation is going on, instead of being allowed to idly return to the fuel-reservoir through the open inlet-valve until the exhaust-valve closes and compression of the air for the next charge begins. In view of the fact that during and at the close of the scavenging operation the air in cylinder A is under a slight compression it may be found expedient in some cases to allow the fuel-inlet valve to close slightly in advance of the exhaust-valve of the combustion-cylinder by arranging tappets $d$ and $d^6$ slightly out of parallel relation on rocker-shaft $d'$ in order to insure the air and fuel entering the latter cylinder at equal pressures. This is a matter depending largely upon the size of the ports, strength of valve-springs, &c., and will be determined by experiment in each engine. By the expression "substantially simultaneous," therefore, as used herein in reference to the closing of valves $v$ and $V^2$, I mean such a relative operation of said valves as under all the given conditions will insure a proper mixture of the air and fuel by causing them to enter the combustion-cylinder at equal or approximately equal pressures. These movements will in all cases be either exactly simultaneous or in such quick succession as to be substantially so.

The governor acts to automatically control the speed of the engine by regulating the time of closing the exhaust-valve $V^2$ and the fuel-inlet valve $v$. If the engine gets to racing, the governor draws the cam-disk $d^4$ outwardly, thereby prolonging the period of contact of the cam-face with the lever $d^3$, and thus causing valves $V^2$ and $v$ to close later in the stroke of the plungers, whereby a smaller charge is admitted to the combustion-cylinder, and vice versa.

From the foregoing it will be seen that in an internal-combustion engine constructed and operating as hereinabove described all possibility of waste of fuel is avoided, because no fuel is admitted to the combustion-cylinder until after the latter has been exhausted, scavenged, and its exhaust-valve closed. The fuel and air forming the components of each charge are supplied to the combustion-cylinder under equal pressures, whereby they are more effectively mixed. Liability of premature explosion is avoided by the thorough scavenging of the combustion-cylinder before the next charge is admitted. By the described arrangement of the working piston approximately one-eighth of a turn in advance of the pump-plungers ignition of the charge is effected at a time when the working piston has well passed its inner dead-point, is already rapidly moving outward, and is consequently in its most advantageous position mechanically to receive and transmit to the crank-shaft the full force of the expansion of the charge, and, finally, as a result of the fact that the charge from the instant of its ignition expands rapidly through the remaining length of the piston-stroke its heat is less and is more evenly distributed over the cylinder-walls than where ignition takes place the instant the working piston has passed its upper dead-point and when its outward movement is very slow. The result of these improved features of construction and operation is an increase in both the efficiency and economy of the two-cycle gas-engine.

Having thus described my invention and illustrated the preferred embodiment thereof, what I claim, and desire to secure by Letters Patent, is—

1. In an internal-combustion engine, the combination with the crank-shaft and the air and fuel pumps arranged tandem, and having their plungers connected to the crank-shaft so as to reciprocate simultaneously, of the combustion-cylinder having its piston connected to the crank-shaft approximately forty-five degrees in advance of the plungers of the air and fuel pumps, means for opening the exhaust-valve of the combustion-cylinder at the end of the working stroke and for holding the same open through approximately half the compressing stroke of the air-pump, whereby the combustion-cylinder is exhausted and scavenged, and means for preventing the compression of fuel in the fuel-pump and its delivery to the combustion-cylinder until after the scavenging operation is completed, whereby air and fuel are supplied to the combustion-cylinder under substantially the same pressure, and the combustible mixture is compressed in the latter through the remainder of the instroke of the working piston, all substantially as and for the purpose set forth.

2. In an internal-combustion engine, the combination with the crank-shaft and the air and fuel pumps arranged tandem, and having their plungers connected to the crank-shaft so as to reciprocate simultaneously, of the combustion-cylinder having its piston connected to the crank-shaft approximately forty-five degrees in advance of the plungers of the air and fuel pumps, means for opening the exhaust-valve of the combustion-cylinder at the end of the working stroke and for holding the same open through approximately half the compressing stroke of the air-pump, whereby the combustion-cylinder is exhausted and scavenged, means for preventing the compression of fuel in the fuel-pump and its delivery to the combustion-cylinder until after the scavenging operation is completed, whereby air and fuel are supplied to the combustion-cylinder under substantially the same pressure, and the combustible mixture is compressed in the latter through the remainder of the instroke of the working piston, a mixer in the head of the combustion-cylinder through which the components of the charge pass on entering said cylinder, and means for igniting the combustible charge when the plungers of the air and fuel pumps have reached their inner dead-point and the working piston has performed approximately one-sixth of its outward stroke, all substantially as and for the purpose set forth.

3. In an internal-combustion engine, the combination with the crank-shaft, of the combustion-cylinder and an air-pump having their pistons operatively connected to the crank-shaft by means of cranks set at an acute angle to each other and the crank of the air-pump following the crank of the combustion-cylinder, an exhaust-valve for the combustion-cylinder and a valve between the combustion-cylinder and the air-pump, both valves being open during a certain period of the instroke of both pistons for scavenging the combustion-cylinder by air from the air-pump, and a fuel-pump provided with a positively-operated valve preventing the admission of fuel to the combustion-cylinder during the period of scavenging, substantially as described.

4. In an internal-combustion engine, the combination with the crank-shaft, of the combustion-cylinder and an air-pump having their pistons operatively connected to the crank-shaft by means of cranks set at an acute angle to each other and the crank of the air-pump following the crank of the combustion-cylinder, a governor-controlled exhaust-valve for the combustion-cylinder and a valve between the combustion-cylinder and the air-pump, both valves being open during a certain governor-determined period of the instroke of both pistons for scavenging the combustion-cylinder by air from the air-pump, and a fuel-pump provided with a positively-operated governor-controlled valve preventing the admission of fuel to the combustion-cylinder during the period of scavenging, substantially as described.

HENNING FRIEDRICH WALLMANN.

Witnesses:
JOSEPHINE BEALE,
SARAH GOLDBERG.